(12) United States Patent
Yang et al.

(10) Patent No.: US 7,224,831 B2
(45) Date of Patent: May 29, 2007

(54) METHOD, APPARATUS AND PROGRAM FOR DETECTING AN OBJECT

(75) Inventors: Ming-Hsuan Yang, Sunnyvale, CA (US); Jongwoo Lim, San Diego, CA (US); David Ross, Toronto (CA); Takahiro Ohashi, Saitama (JP)

(73) Assignee: Honda Motor Co., Tokyo (JP)

( * ) Notice: Subject to any disclaimer, the term of this patent is extended or adjusted under 35 U.S.C. 154(b) by 167 days.

(21) Appl. No.: 10/858,878

(22) Filed: Jun. 1, 2004

(65) Prior Publication Data
US 2005/0180602 A1 Aug. 18, 2005

Related U.S. Application Data

(60) Provisional application No. 60/545,759, filed on Feb. 17, 2004.

(51) Int. Cl.
G06K 9/36 (2006.01)
(52) U.S. Cl. ........................ 382/154; 382/168
(58) Field of Classification Search ................ 382/106, 382/154, 168, 171, 173; 348/139; 356/3.13, 356/3.14
See application file for complete search history.

(56) References Cited

U.S. PATENT DOCUMENTS

| | | | |
|---|---|---|---|
| 5,710,833 A | 1/1998 | Moghaddam et al. | 382/228 |
| 6,404,484 B1 * | 6/2002 | Sogawa | 356/3.14 |
| 6,609,093 B1 | 8/2003 | Gopinath et al. | 704/236 |
| 6,661,918 B1 | 12/2003 | Gordon et al. | 382/173 |
| 2004/0190752 A1 * | 9/2004 | Higaki et al. | 382/103 |

FOREIGN PATENT DOCUMENTS

| | | | |
|---|---|---|---|
| EP | 0 874 331 A2 | | 10/1998 |
| JP | 8-329254 A | * | 12/1996 |
| WO | WO 03/073359 A2 | | 9/2003 |

OTHER PUBLICATIONS

Belhumeur, Peter N. et al., *Eigenfaces vs. Fisherfaces: Recognition Using Class Specific Linear Projection*, IEEE Transactions on Pattern Analysis and Machine Intelligence (Jul. 1997), vol. 19, No. 7, pp. 711-720.

(Continued)

*Primary Examiner*—Andrew W. Johns
(74) *Attorney, Agent, or Firm*—Fenwick & West LLP; Mark Duell

(57) ABSTRACT

The advantage of the present invention is to appropriately detect the object. The object detection apparatus in the present invention has a plurality of cameras to determine the distance to the objects, a distance determination unit to determine the distance therein, a histogram generation unit to specify the frequency of the pixels against the distances to the pixels, an object distance determination unit that determines the most likely distance, a probability mapping unit that provides the probabilities of the pixels based on the difference of the distance, a kernel detection unit that determines a kernel region as a group of the pixels, a periphery detection unit that determines a peripheral region as a group of the pixels, selected from the pixels being close to the kernel region and an object specifying unit that specifies the object region where the object is present with a predetermined probability.

27 Claims, 8 Drawing Sheets

OTHER PUBLICATIONS

Osuna, E. et al., *Training Support Vector Machines: an Application to Face Detection*, Computer Vision and Pattern Recognition, 1997, pp. 130-136.

Vapnik, V. N., *The Nature of Statistical Learning Theory*, Springer-Verlag New York, Inc., 1995, pp. 133-156.

Faber, P., "Seat Occupation Detection Inside Vehicles," IEEE Southwest Symposium on Image Analysis and Interpretation, Apr. 2, 2000, pp. 187-191.

"Supplementary European Search Report," European Patent Office, EP 05713022, Feb. 21, 2007, 3 pages.

* cited by examiner

FIG. 4A
FIG. 4B
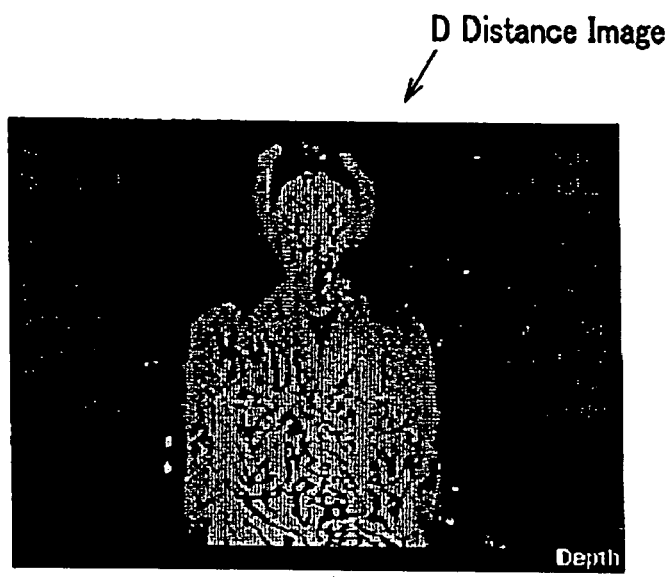
D Distance Image
FIG. 4C
| (x,y) | Parallax | Distance |
|---|---|---|
| (0,0) | 0 | (00m) |
| ⋮ | ⋮ | ⋮ |
| (200,200) | 15 | (0.99m) |
| ⋮ | ⋮ | ⋮ |

FPM Probability Map

METHOD, APPARATUS AND PROGRAM
FOR DETECTING AN OBJECT

RELATED APPLICATIONS

This application claims the benefit of U.S. Provisional Patent Application No. 60/545,759, filed Feb. 17, 2004, which is incorporated by reference in its entirety.

BACKGROUND OF THE INVENTION

1. Field of the Invention

The present invention relates to an apparatus, a method and a computer program to carry out the detection of the objects, primarily the detection of the object images taken by the cameras included therein and the detection of the objects in is the application. The present invention particularly has an advantage to provide the apparatus, the method and the computer program that realize a simple but a precise visual detection of the objects and the object images.

2. Background of the Invention

There is a well-known technology called SNAKES for determining a contour of an object taken in a graphic image. By using this technology, the contour of the object is determined in such a way that the contour model is assumed by using the initial vague counter extracted in the graphic image and then the contour model is specified by shrinking and deforming under a predetermined rule towards the ultimate contour. One of the application of this technology is that edges (that is, a boarder where two adjacent pixels have large changes in the light intensity) of a moving object is detected and the object is detected by determining the contour in association with the contour model linked with the edges (for example, see Page 7 and the FIGS. 9 and 10, Japanese Published Patent, 08-329254, A (1996), which is incorporated herein by reference).

The above edge detection, that is to detect the object by SNAKES, has an advantage in determining the precise contour of the object. However, it requires a lot of computation power for the purpose of creating the edge image and determining the contour modeling.

SUMMARY OF THE INVENTION

The advantage of the present invention is to provide a process that is simple and less dependent on the observing place in order to appropriately detect the object.

The present invention uses the three-dimensional characteristics of objects in the determination of their shapes. This determination is completely different from the contour based detection since the contour detection uses two-dimensional characteristics of the objects. The present invention uses the image of the object which provides a portion of object and image is combined with the distance information wherein the distance is defined by that from the image acquiring cameras to the object. Therefore the portion of the object can be evaluated with the possible portion of the object which represents the two dimensional information of the object and with the possible position (actually the distance from the cameras) which represents the third dimensional information of the object. The combination of the portion information and the position information is evaluated by the probability so that the object is determined with such three dimensional information. For this process, the portion information in the two dimensional data and distance information are all the observed ones and have effectively self-determinative so that no large computation is required like as the conventional contour method such as SNAKES.

The object detection apparatus regarding the present invention has a plurality of cameras to determine the distance to the objects, a distance determination unit to determine the distance therein, a histogram generation unit to specify the frequency of the pixels against the distances to the pixels, an object distance determination unit that determines the most likely distance, a probability mapping unit that generates a map of the probability values of the pixels based on the difference of the distance, a kernel detection unit that determines a kernel region as a group of the pixels, a periphery detection unit that determines a peripheral region as a group of the pixels, selected from the pixels being close to the kernel region and an object specifying unit that specifies the object region where the object is present with a predetermined probability.

The object detection method in the present invention has the steps to fulfill the functions realized in the units described in the object detection apparatus of the present invention.

The computer program for detecting an object image in the present invention has computer programs to operate a computer to fulfill the functions realized in the units described in the object detection apparatus of the present invention.

As for a specific nomenclature to the present invention, we use "object detection", "detecting objects" or the similar expressions for the meanings of "visual detection of the object" or "object detection in images". All discussions in this specification are based on this nomenclature and the resultant technical implication.

BRIEF DESCRIPTIONS OF THE DRAWINGS

The invention has other advantages and features which will be more readily apparent from the following detailed description of the invention and the appended claims, when taken in conjunction with the accompanying drawings, in which:

FIG. 4A shows an example of the image acquired by a CCD camera of the present invention, according to an embodiment.

FIG. 4B shows an example of the distance image generated from image shown in FIG. 4A, according to an embodiment.

FIG. 4C shows the correspondence of the parameters used for the distance image shown in FIG. 4B, according to an embodiment.

DETAILED DESCRIPTION OF THE PREFERRED EMBODIMENTS

Figure 1:
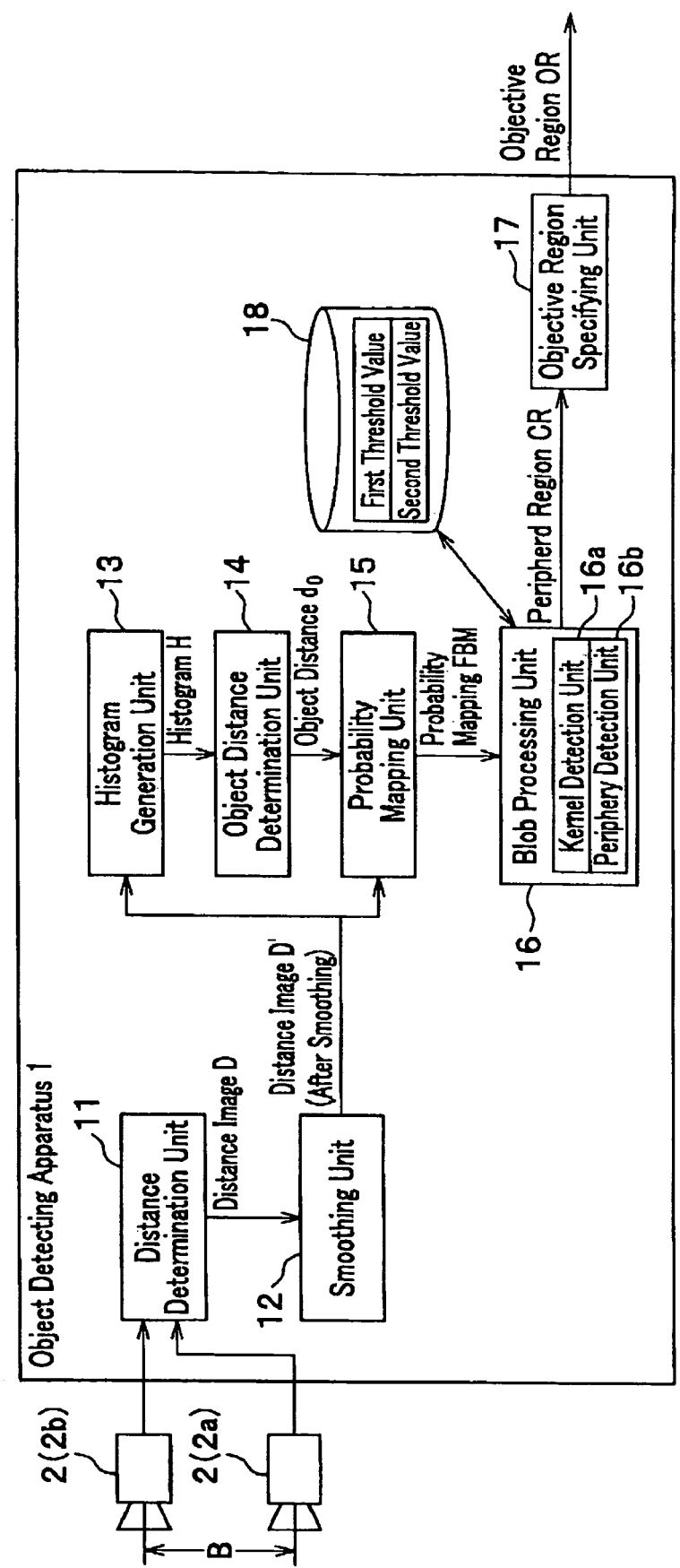
FIG. 1 is a functional block diagram that shows the object detecting apparatus of the present invention, according to an embodiment.

The object detection apparatus in the present invention has a plurality of cameras to determine the distance to the objects by using the parallax, a distance determination unit to determine the distance therein, a histogram generation unit to specify the frequency of the pixels in the portion of the image taken by the cameras against the distances to the pixels, the object distance determination unit that determines the likely distance where the quantity of the pixels has the maximum in the histogram, a probability mapping unit that generates a map of the probability values of the pixels based on the difference of the distance from the most likely distance obtained by the object distance determination unit, a kernel detection unit that determines a kernel region as a group of the pixels which have the probabilities more than the first threshold value, periphery detection unit that determines a peripheral region as a group of the pixels, selected from the pixels being close to the kernel region, which have the probabilities more than the second value but less than the first threshold value and an object specifying unit that specifies the object region where the object is present with a predetermined probability.

In this apparatus, it is not necessary to compute the contour which needs much of the computation power for edge computation and the connectivity computation of the contour lines so that less burden to the computer is required. No color detection is carried out and then reduces the computation power as well. Another advantage of the present invention is as follows. The distance determined by the a distance determination unit tends to have an erroneous distance if the object is planar and has less surface marking due to the difficulty in the triangular measurement by the plurality of cameras so that there is a potential risk that the pixels specified in such an erroneous distance is the whole object or the portion of the object. However, the object specifying unit selects the pixels in the region which is close to the kernel region so that the pixels which are erroneously determined to have the similar distances to that of the object are excluded from the selection. Therefore, this invention provides a robust object detecting apparatus for the various kinds of objects.

It is preferred that the probability mapping unit evaluates the probability value of the pixels by the following equation (1), $$P = \frac{1}{C^{\frac{(d-d_0)^2}{a}}}, \quad (1)$$

where, d is the distance to the pixel, $d_0$ the most likely distance; at the normalization constant, C (C>1) an arbitrarily given constant. In order to take a well-known formula for the probability, it is preferable that C should be the natural number. Therefore the equation (1) can be modified as follows, $$P = \exp\left[-\left(\frac{d-d_0}{a}\right)^2\right]. \quad (2)$$

The most probable value is given by a unity and the probability can be normalized in this maximum value so that the probability evaluation can be consistently applied to all distance determinations.

In the periphery detection unit, the object specifying unit can select, for instance, three peripheral regions in the order of the largest quantity of pixels, in other words, in the order of the largest area of the peripheral regions as the peripheral regions. We can further specify the rectangular region that circumscribes three regions as the peripheral region.

The object distance determination unit preferably has a spatial filter such as Gaussian filter to remove the exogenous noises and spurious noises from the distances obtained for the pixels (we call the mapping image of distances over all pixels a distance image, hereinafter) so that the histogram is modified by using the filtrated distance. Then it is possible to specify the most likely distance in accordance with the largest frequency of the pixels at the most likely distance after smoothing the distance image. The filtration is performed by an interpolation over the distances which are given against the pixels which compose a planer map corresponding to the viewing image taken by the cameras.

By using a Gaussian filter, it is possible to interpolate the defects in the image due to the disturbance of the noises if the distance image has lost some part of the images of the objects. By this filter effect of the Gaussian filter, it is rather easy to specify the object. It is possible to exploit this advantageous effect of the filter to the present invention since no contour detection is adopted in the present invention.

The periphery detection unit repetitively selects the pixels which are close to the kernel region that the kernel detection unit specifies under the condition of two threshold values of the probability as described above.

The object detection method in the present invention has a distance determination step to determine the distance by using a plurality of cameras and the parallax in the view of objects seen by the cameras, a histogram generation step to specify the frequency of the pixels in the portion of the image taken by the cameras against the distances to the pixels, the object distance determination step that determines the most likely distance where the quantity of the pixels has the maximum in the histogram, a probability mapping step that provides the probabilities of the pixels based on the difference of the distance from the most likely distance obtained by the object distance determination step, a kernel detection step that determines a kernel region as a group of the pixels which have the probabilities more than the first threshold value, periphery detection step that determines a peripheral region as a group of the pixels, selected from the pixels being close to the kernel region, which have the probabilities more than the second value but less than the first threshold value and an object specifying step that specifies the object region where the object is present with a predetermined probability.

It is preferred that the probability mapping step evaluates the probability value of the pixels by the following equation (3), $$P = \frac{1}{C\left(\frac{d-d_0}{a}\right)^2},\tag{3}$$

where, d is the distance to the pixel, $d_0$ the most likely distance, a the normalization constant, C (C>1) an arbitrarily given constant.

The object distance determination step preferably has a spatial filter such as Gaussian filter to remove the exogenous noises and spurious noises from the distance image so that the histogram is modified by using the filtrated distance. Then it is possible to specify the most likely distance in accordance with the largest frequency of the pixels at the most likely distance after smoothing the distance image.

In the periphery detection step, the object specifying step can select, for instance, three peripheral regions in the order of the largest quantity of pixels, in other words, in the order of the largest area of the peripheral regions as the peripheral regions. We can further specify the rectangular region that circumscribes three regions as the peripheral region.

The periphery detection step repetitively selects the pixels which are close to the kernel region that the kernel detection step specifies under the condition of two threshold values of the probability as described above.

The present invention can be provided by a computer readable medium which stores a computer program that executes the operation of the above object detecting apparatus in the designated function as described above.

The present invention has an advantage to detect the objects in a simple computation process. The usage of the peripheral region against the kernel region of the object serves another advantage of the present invention such that the erroneous detection of the object caused by the plane shape can be avoided. The further advantage of the present invention has a robust object detection capability by effectively interpolating the lack of image of the object due to the noise disturbances.

We will explain the embodiment of the present invention using the figures as follows.

FIG. 1 is a functional block diagram that shows the object detecting apparatus 1 of the present invention. The object detecting apparatus acquires the images of objects such as figures and substances by using two cameras and specifies the object region in the acquired image. The object detecting apparatus 1 comprises a distance determination unit 11, a smoothing filter unit 12, a histogram generation unit 13, an object distance determination unit 14, a probability mapping unit 15, a block processing unit 16, a kernel detection unit 16a and a threshold value memory 18. The two cameras, as the right hand side camera 2a and the left hand side camera 2b, are set in a distance B apart each other.

The units for 11 to 17 can be realized by executing a computer program operating with a versatile computer system that includes memory devices as RAMS, ROMs and peripheral storage devices, CPU and output devices. The information processed in the units 11 to 17 are retrieved from and stored in the memory devices.

The acquired images taken by the cameras 2 are input to a distance determination unit 11 from the image input device which is not shown in the figures.

The distance determination unit 11 analyzes the two acquired images which are taken by the cameras 2a and 2b at the same time and determines the distances (more precisely, those from the focus planes of the cameras) to all objects specified by two acquired images. The distance determination unit 11 generates the distance image from these two acquired images with the distances to all objects as determined above. The distance image is stored in the memory devices before it is further processed. The acquired image by the cameras 2 are input to the distance determination unit 11 at a rate such that, for example, in a frame for every 100 ms.

The determination of the distance by the distance determination unit 11 is as follows. A certain image block is specified in the acquired image taken by the right hand side camera 2a as a reference image and is compared with the corresponding image block in the acquired image simultaneously taken by the left hand side camera 2b for the purpose of block matching. Then the parallax is computed by the difference of the locations of the two matched image blocks. The distance image is generated with the acquired image combined with the distance that is determined by the parallax explained above.

Assuming the parallax Z, the distance L to the object from the camera 2 (not shown in the figures), the focal length $f$ of the camera 2 (not shown in the figures) and the separation distance B between the right hand side camera 2a and the left hand side camera 2b, the distance to the object is given by the equation (2) as, $$L = B \times f/Z \tag{2}$$

By using FIGS. 4A and 4B, the distance image generated by the distance determination unit 11 is explained in detail. FIG. 4A, FIG. 4B and FIG. 4C are the acquired image input in a manner of time-series, the distance image and the correspondence of the parameters used for the distance image, respectively.

FIG. 4A shows an example of the acquired image in which a person's figure is taken in the central position of the image. The distance image D shown in FIG. 4B is presented by an attribution of the pixel of which parallax is determined by the image acquired by the right hand side camera and the image by the left hand side one. The attribution of the pixels as shown in FIG. 4B are obtained by the correspondence of the parameters used for the distance image as shown in FIG. 4C. The larger the parallax is, the closer the object is and vice versa. FIG. 4B shows the distance as the attribution of the pixel in which the distance is presented by the intensity of the pixel. The large intensity is given for the pixels of which attributions present the short distance and the weak intensity for those of which attributions do the long distance.

As shown in FIG. 4C, the parallax is zero at the coordinate (0, 0) which implies that the object on the pixel at the coordinate (0, 0) locates in the infinite point. The parallax at the pixel in the coordinate (200, 200) is 15 as shown in FIG. 4C, which implies the object in the pixel locates 0.99 m apart from the reference camera.

The distance image D as shown in FIG. 4C shows a plurality of scattered black points such as shown in FIG. 4B since the parallaxes are determined to be zero (that is, these points locates in infinite positions) due to lack of the pixel matching at the portion where the change of the light intensity and the change of color are less.

Figure 5A:
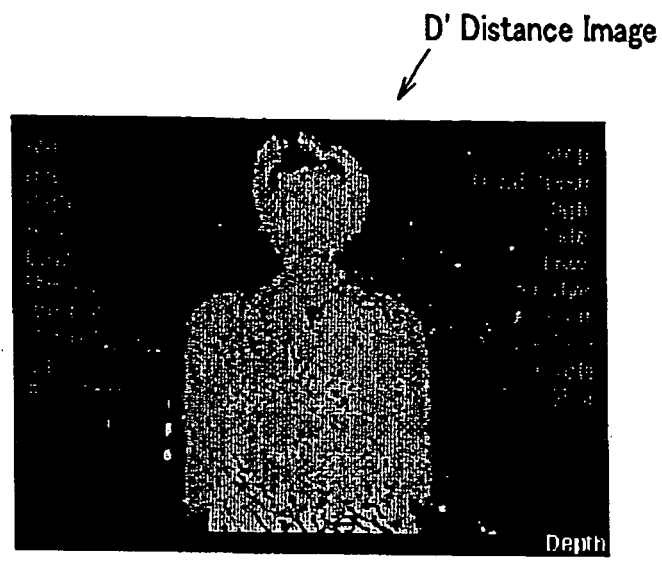
FIG. 5A shows an example of the distance image D' which 5 has been smoothed by a Gaussian filter, according to an embodiment.

The smoothing filter 12 retrieves the distance image from the storage device and filtrates the intensity data into another intensity data which are composed into another distance image D' stored in the storage device. By this smoothing filter 12, the scattered black point caused by the lack of correct distance parameter is interpolated by adjacent infinite distance values. For this smoothing filtration, a Gaussian filter is used. FIG. 5A shows an example of the distance image after filtrating by the Gaussian filter against the distance image shown in FIG. 4B.

Figure 5B:
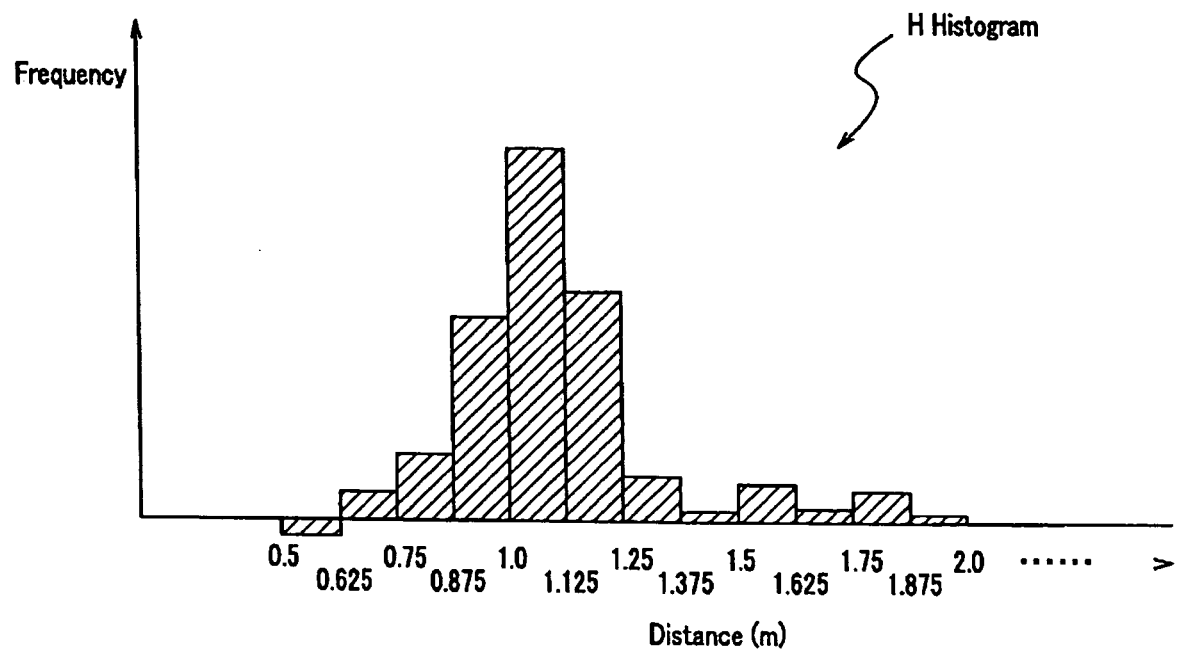
FIG. 5B shows an example of the histogram of the pixel counts against the distances which have been classified into several steps, according to an embodiment.

The histogram generation unit 13 retrieves the distance image D' (which has been filtrated). All of the pixels on the image are evaluated by the distance from the camera and the frequency of the pixel, which is the quantity of the pixel count for every distance. This frequency against the distance is stored in the storage device. A frequency histogram is generated in such a way that the distance is classified into a plurality of ranges of the distances and the count numbers of the pixels which are in these ranges. The plurality of ranges are, for example, 20 classifications for 0.5–3 meters distance range, such as 0–5–0.625 meters, 0–625–0.75 meters, . . . as a 0.125 meters interval. The frequency of the pixels is evaluated on this classification of the distance. FIG. 5B shows the resultant histogram.

An object distance determination unit 14 retrieves the data of the histogram H and determines the most likely distance among the distance classification where the quantity of the pixels in the classified distance has the maximum in the histogram. The most likely distance is specified as $d_0$ and is recorded in the storage device.

For example, the frequency of the pixels has the maximum value at the distance classification for 1–1.125 meters and the typical distance value as 1.0625 meters is specified for the most likely distance $d_0$.

Figure 6A:
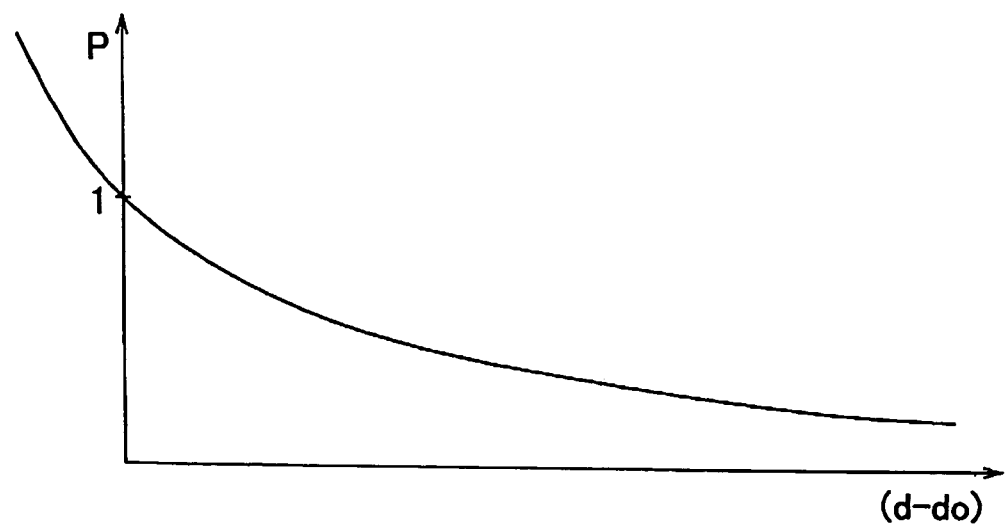
FIG. 6A shows the probability value P against the distance as $d-d_0$, according to an embodiment.

The probability mapping unit 15 generates an FPM (Foreground Probability Map) in such a way that the distance d determined for each pixel and the most likely distance $d_0$ make a difference as $(d-d_0)$ and the probability map that shows the probability of each pixel is generated.

$$P = \frac{1}{C\left(\frac{d-d_0}{a}\right)^2}$$

where, we take C as the natural number and then the equation (4) can be modified as $$P = \exp\left[-\left(\frac{d-d_0}{a}\right)^2\right],$$

where, the constant a decides the width of the probable presence of the object. FIG. 6A shows the probability value P against the difference of the distance $(d-d_0)$. The constant a is to normalize the Gaussian function especially the width of the function shape.

A Blob processing unit 16 retrieves the probability map as FPM and determines a peripheral region CR which has high probability value as well as a kernel region.

Especially, the Blob processing unit 16 has a kernel detection unit 16a and a peripheral detection unit 16b. Two threshold values as the first threshold value TH1 and the second threshold value TH2 which is smaller than TH1 are recorded in the storage device.

The kernel detection unit 16a retrieves the first threshold value TH1 as well as the probability map FPM, the region occupied by the pixels that satisfy

P>TH1, is determined as a kernel and the positions of all these pixels are recorded in the storage device.

Figure 7A:
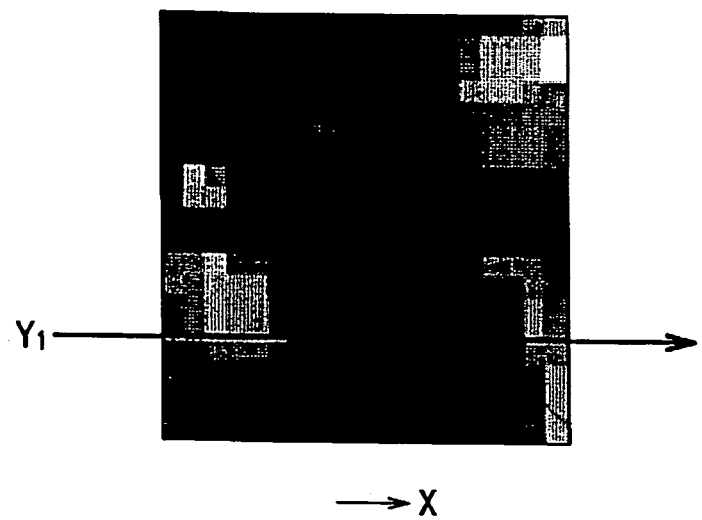
FIG. 7A shows a zoom up view of the probability mapping FPM, according to an embodiment.
Figure 7B:
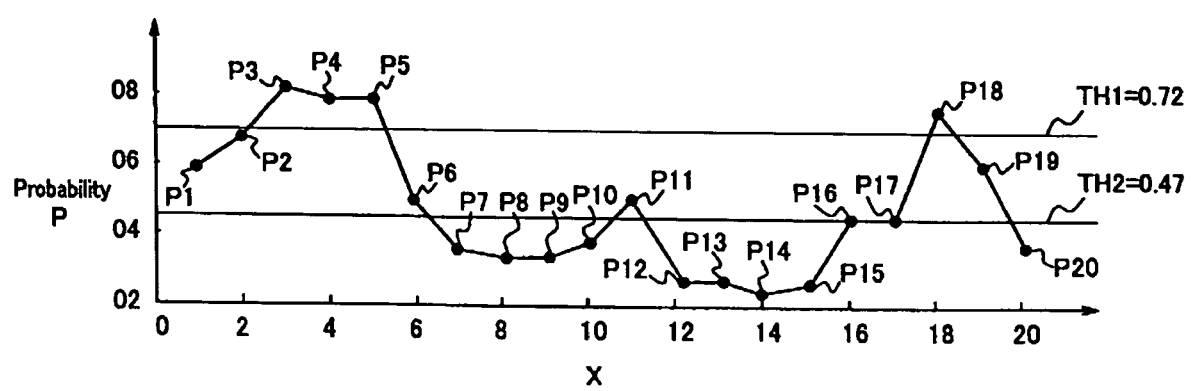
FIG. 7B shows a process in the Blob process, according to an embodiment.

FIG. 7A shows a zoom up view of the probability map FPM and FIG. 7B shows the probability values of the pixels on the axis $Y_1$ along the X axis.

For the example as shown in FIG. 7B, the pixels seen at the point P3 to P5 and P18 have the probability values more than the threshold TH1. For this example, TH1 is selected as 0.72 for the value.

The periphery detection unit 16b retrieves the second threshold value TH2 as well as the probability map FPM from the storage device. The pixels which satisfy the following neighboring condition are selected as neighboring pixels to the kernel region. First, the pixels adjacent to the kernel region are selected and compared with the second threshold value to satisfy the following inequality;

P>TH2.

After those pixels satisfying the above condition are selected, new pixels which are adjacent to those pixels are checked to satisfy the same inequality;

P>TH2

The same checking is continued until the region where all pixels satisfy the above neighboring condition is ultimately determined. This region is called peripheral region CR.

By using FIG. 7B, those pixels in the peripheral region CR as being adjacent to P3 to P5 and having larger probability value than the second threshold value are P2 and P6. As repeating the same process, it is found that P1 can be included in the peripheral region CR. For such repetitive process for the pixel P18, the pixels P16, P17 and P19 are can be found for the peripheral region CR. In this example, we have used 0.45 for the second threshold value TH2.

On the other hand, if the pixel is not adjacent to the kernel region, it cannot be selected for the peripheral region CR. For example, the pixel P11 is not selected since the repetitive process does not reach to P11.

Figure 6B:
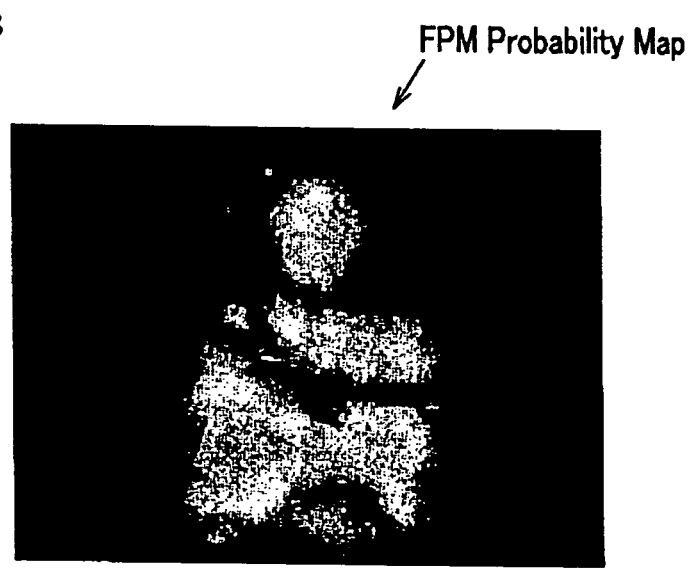
FIG. 6B shows an example of probability map FPM generated from the distance image D', according to an embodiment.
Figure 6C:
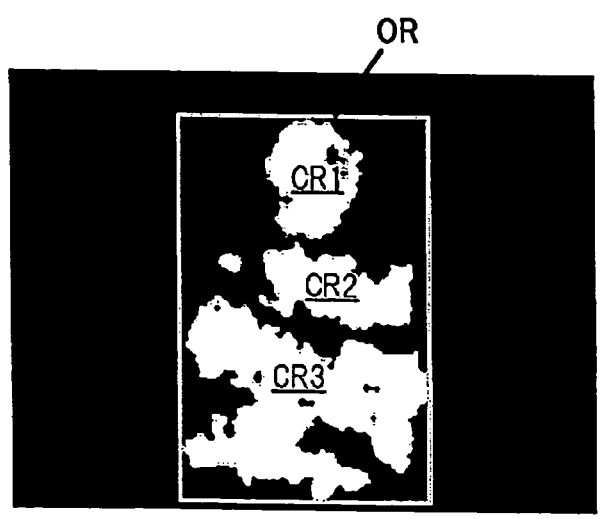
FIG. 6C shows the probability value P against the distance as $d-d_0$, according to an embodiment.

The peripheral region CR is specified by these all pixels. In many case, a plurality of regions for the peripheral region CR are selected. FIG. 6C shows such example, that is, the plurality of peripheral regions CR1 to CR3 are selected from the probability map as shown in FIG. 6B.

The periphery detection unit 16b retrieves the peripheral region CR from the stored device and determines the objective region OR as explained below.

In the present embodiment, the top three of the large areas, in other words, those including many pixels, regarding the peripheral regions CR are selected. They are CR1, CR2 and CR3 in FIG. 6C. The circumscribed rectangles against peripheral regions CR are specified and they are determined to be the object region OR. The object region OR is specified in such a way that the largest area is only selected for the circumscribed rectangle or the peripheral regions CR are directly used for the object region OR. The determined object region OR is stored and used for the identification of the human faces.

Figure 8:
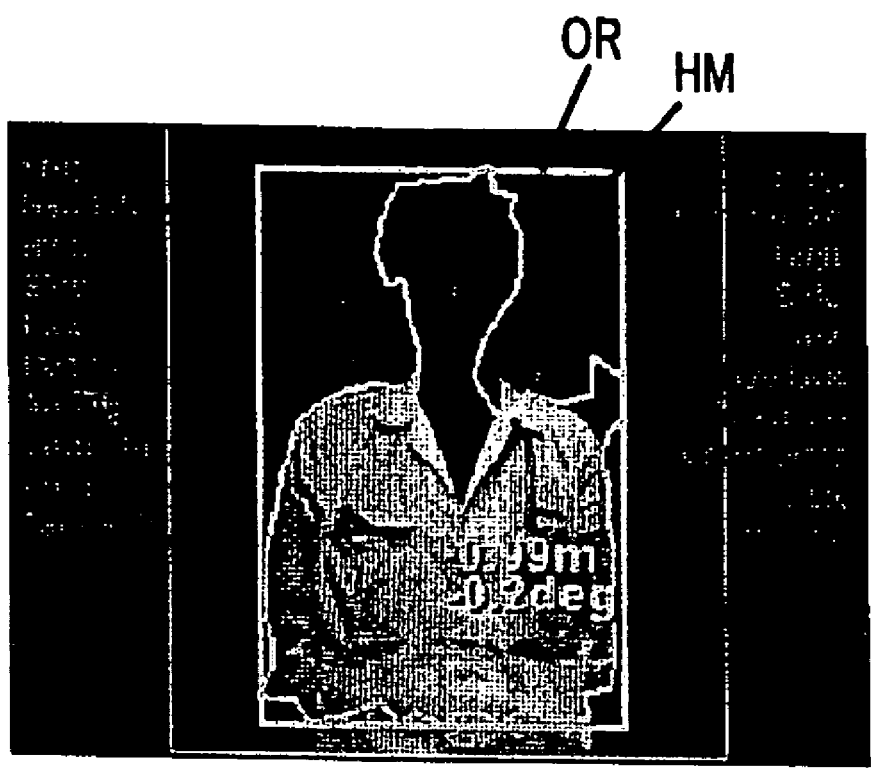
FIG. 8 shows the region selected as an object region OR, according to an embodiment.

Once the object region OR is superimposed in the original acquired image, the resultant object region OR circumscribes the human image HM as shown in FIG. 8. This implies that the human image HM is extracted in the acquired image and determined as a singe object where no contour determination process is exploited but the distance information of the object is used, so that the spatial solidity of the object is obtained even for the discrete pixel images without consideration of contour of the object image. This feature can be applied to the human is face identification where the region of the human face is detected by extracting the image including the human face. Then the intrinsic face data is specified, the vector distance in Fisher's face data is obtained, the spatial position of the face is determined and finally the face identification of a specific person can be done.

The detection of another object which is in the different distance from do is carried out by resetting (the probability value on the pixels is set to be zero) the distance image which has already been generated by the distance determination unit 11 and by repeating the above processes.

In the above embodiment, a distance determination unit 11 generates the distance image by using two cameras 2 however three cameras can be used. This invention have further advantage by using three cameras or more such as three cameras in the vertical direction and three cameras in the horizontal direction are aligned into a matrix form. This alignment of cameras in the distance measurement can provide accurate distance determination since the distance to the object can be done by an over-determinant method where the influence of the shadows or the surface reflections of the object can be suppressed.

Figure 2:
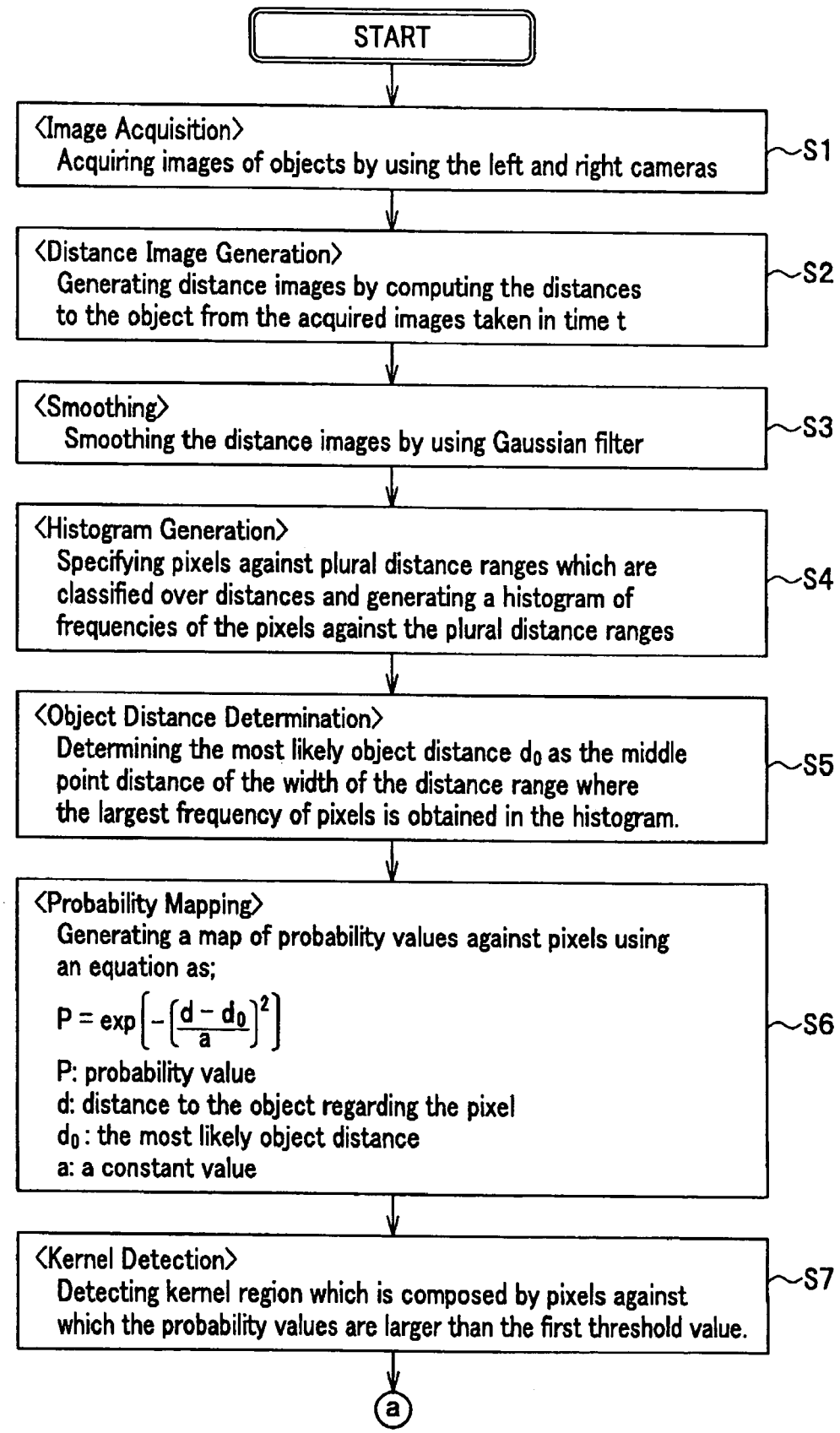
FIG. 2 shows a part of a flow chart regarding the operation of the present invention to carry out the object detection, according to an embodiment.
Figure 3:
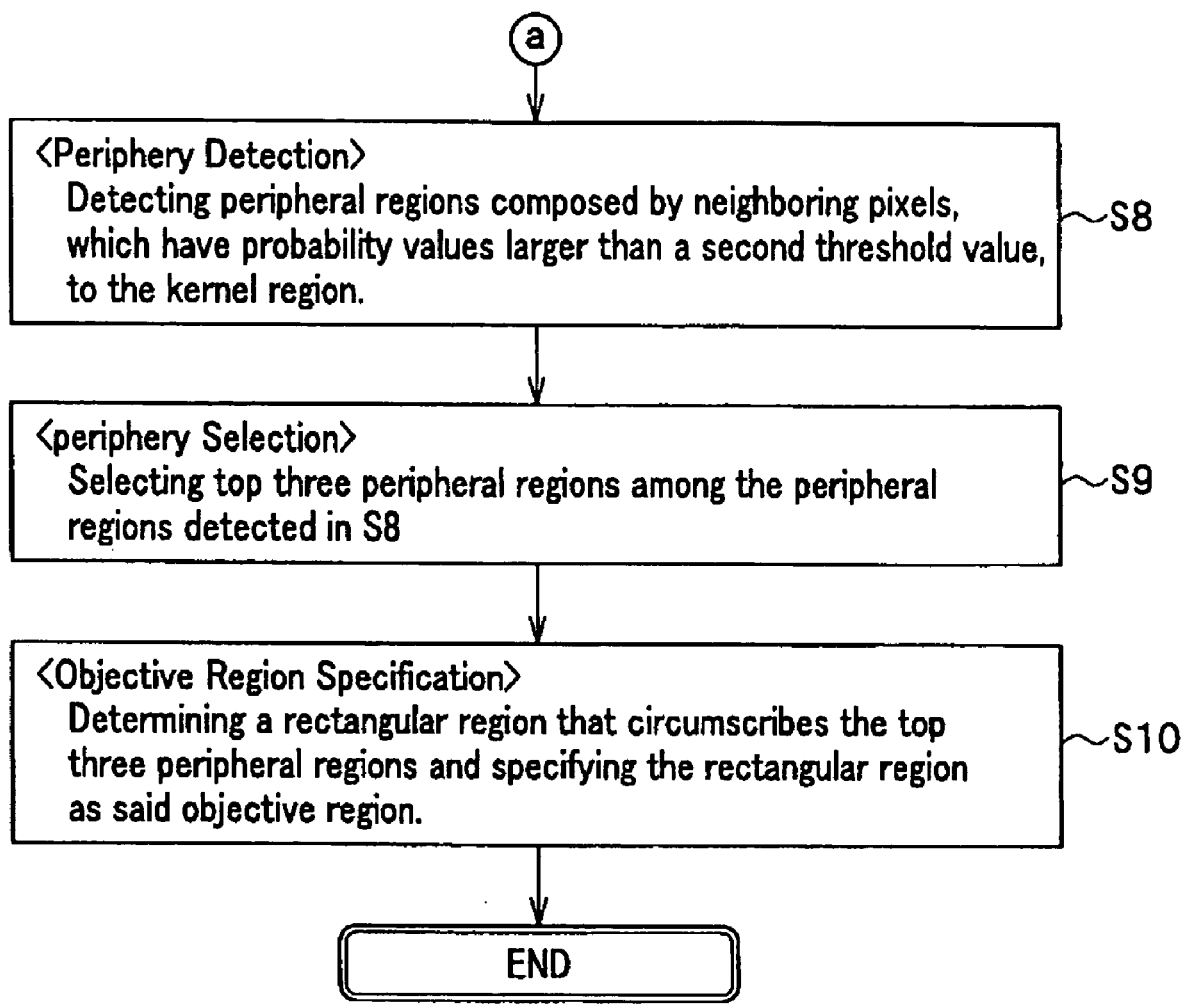
FIG. 3 shows the other part of the flow chart regarding the operation of the present invention to carry out the object detection, according to an embodiment.

The method for detecting the object is explained using FIG. 1, FIG. 2 and FIG. 3.

(Image Acquisition Step)

The object detecting apparatus 1 acquires the images of objects in a time-series data form through two cameras which concurrently operate (Step S1).

(Distance Image Generation Step)

By using distance determination unit 11, the object detecting apparatus 1 generates a distance image D which includes the distance against every pixel computed by the parallax of the two camera view against the every pixel which composes the image of the object as a whole (Step S2).

(Smoothening Step)

By using the smoothing unit 12, the object detection apparatus 1 smoothes the distance data presented by the intensity of the pixel on the distance image and then generates a smoothed distance image D' (Step S3), which is sent to the histogram generation unit 13 and the probability mapping 25 generator 15.

(Histogram Generation Step)

By using the histogram generation unit 13, the object detection apparatus 1 computes the frequency of the pixel against the distances of the presence in a manner of sections that are classed by 12.5 cm in the possible presence in 0.5 meters to 3 meters (Step S4) and generate a histogram H.

(Object Distance Determination Step)

By using the object distance detection unit 14, the objection detection apparatus 1 selects a particular classified section in which the maximum frequency of the pixel is obtained in the histogram H in the object distance determination unit 14 and the mean value of the selected classified section is set do as the most likely object distance (Step S5). For example, the most likely object distance $d_0$ is 1.0625 meters which is the middle point between the 1.0–1.125 meters where the maximum frequency is obtained in the histogram H shown in FIG. 5A.

(Probability Mapping Step)

By using probability mapping unit 15, the objection detection apparatus 1 computes the probability of the pixel to present the object in the probability mapping unit 15 and the probability map FPM (Step S6). The probability value P is computed by the equation (4) as defined before.

(Kernel Detection Step)

By using the kernel detection unit 16a in the Blob processing unit 16, the objection detection apparatus 1 selects the pixels in which the probability value P is larger than the first threshold value TH1 by using the probability map FPM and detects the kernel (Step S7).

(Periphery Detection Step)

By using the periphery detection unit 16b in the Blob processing unit 16, the objection detection apparatus 1 selects such pixels among the pixels neighboring to the kernel detected by the step S7 that has the probability value P, which is larger than the first threshold value TH2, by using the probability map FPM and sets the a peripheral region CR (Step S8).

(Periphery Selection Step)

By using objective region specifying unit 17, the objection detection apparatus 1 selects the top three of the peripheral regions CR (or top three of the region areas) which include many pixels (Step S9).

(Objective Region Specifying Step)

The objective region specifying unit 17 determines the circumscribed rectangles for the three periphery sections CR1, CR2 and CR3 selected in the step S 9. In other words, the positions of the maximum coordinative values and the positions of the minimum value positions for X-axis (the horizontal axis) and Y-axis (vertical axis) for these periphery sections are determined and the objective region specifying unit 17 resultantly specifies these circumscribed rectangles.

After processing all these steps, the objection detection apparatus 1 can detects the object which is present in the acquired image taken by the camera 2.

Although there have been disclosed what are the patent embodiment of the invention, it will be understood by person skilled in the art that variations and modifications may be made thereto without departing from the scope of the invention, which is indicated by the appended claims. For example, though the probability value P defined by equations (3) and (4), $(d-d_0)$ or $(d-d_0)^2$ may be exploited for the probability value. Since the larger the probability values are the smaller the value $(d-d_0)$ or $(d-d_0)^2$ is, the kernel is selected by the pixels where the value $(d-d_0)$ or $(d-d_0)^2$ is smaller (but larger as the probability value) than the first threshold value TH1.

It is possible to carry out the objective person detection by the conventional edge detection and the contour extraction after detecting the objective person by the object detecting apparatus and method provided by the present invention.

What is claimed is:

1. An object image detecting apparatus using a plurality of images concurrently acquired by a plurality of cameras which take said plurality of images composed of pixels, comprising:

a distance determination unit which determines distances to portions of an object to visually be detected wherein parallaxes obtained on a plurality of images are used;

a histogram generation unit which specifies frequencies of said pixels against a plurality of distance ranges which are classified over said distances given by said distance determination unit;

an object distance determination unit which determines a most likely distance among said plurality of distance ranges by selecting a distance range which has the largest frequency of said pixels among pixel frequencies specified by said histogram;

probability mapping unit which generates a map of probability values against said pixels wherein said probability values are computed by differences between said most likely distance and said distances given by said distance determination unit;

a kernel detection unit which detects a kernel region composed by pixels against which said probability values are larger than a first threshold value;

a periphery detection unit which detects at least one of peripheral regions composed by neighboring pixels which neighbor around pixels composing said kernel region wherein probability values against said neighboring pixels are larger than a second threshold value which is smaller than said first value; and an objective region specifying unit which specifies objective regions based on at least one of said peripheral regions.

2. An object image detecting apparatus according to claim 1, wherein;

said probability mapping unit computes said probability value P for distance image against each of said pixels by using an equation given by $$P = \frac{1}{C^{\frac{(d-d_0)^2}{a}}} \quad (C > 1),$$

where, $d_0$ and d are said most likely distance and each of said distances given by said distance determination unit for said pixels, respectively and C and $\alpha$ are both constant values.

3. An object image detecting apparatus according to claim 2, wherein;

a periphery detection unit which selects a predetermined quantity of said peripheral regions in a decreasing order of region areas, and said objective region specifying unit specifies objective regions based on said predetermined quantity of said peripheral regions.

4. An object image detecting apparatus according to claim 2, wherein;

said periphery detection unit selects a predetermined quantity of said peripheral regions in a decreasing order of region areas, and said objective region specifying unit specifies a rectangular region that circumscribes a predetermined quantity of said peripheral regions as said objective region.

5. An object image detecting apparatus according to claim 1, wherein;

said object distance determination unit has further a spatial filter to provide filtrated distances by interpolating said distances given by said distance determination unit for said pixels, said histogram generation unit specifies frequencies of said pixels against a plurality of distance ranges which are classified over said filtrated distances given by said distance determination unit, and said object distance determination unit determines a most likely distance among said plurality of distance ranges by selecting a distance range which has the largest frequency of said pixels among pixel frequencies specified by said histogram.

6. An object image detecting apparatus according to claim 5, wherein;

said periphery detection unit selects a predetermined quantity of said peripheral regions in a decreasing order of region areas, and said objective region specifying unit specifies said predetermined quantity of said peripheral regions as said objective regions.

7. An object image detecting apparatus according to claim 5, wherein;

said periphery detection unit selects a predetermined quantity of said peripheral regions in a decreasing order of region areas, and said objective region specifying unit specifies a rectangular region that circumscribes a predetermined quantity of said peripheral regions as said objective region.

8. An object image detecting apparatus according to claim 1, wherein;

said periphery detection unit selects pixels against which probability values are larger than said second threshold value among pixels adjacent to said kernel region, repetitively selects pixels against which probability values are larger than said second threshold value among pixels adjacent to those selected pixels therebefore and ultimately determines peripheral regions in such repetitive selection.

9. An object detecting method using said object image detecting apparatus according to claim 1.

10. An object image detecting method using a plurality of images concurrently acquired by a plurality of cameras which take said images composed of pixels, comprising:

a distance determination step which determines distances to portions, of which images are represented by said pixels, of an object to visually be detected wherein parallaxes obtained on a plurality of images are used, a histogram generation step which specifies frequencies of said pixels against a plurality of distance ranges which are classified over said distances given by said distance determination step, an object distance determination step which determines a most likely distance among said a plurality of distance ranges by selecting a distance range which has the largest frequency of said pixels among pixel frequencies specified by said histogram, probability mapping step which generates a map of probability values against said pixels wherein said probability values are computed by differences between said most likely distance and said distances given by said distance determination step, a kernel detection step which detects a kernel region composed by pixels against which said probability values are larger than a first threshold value, a periphery detection step which detects at least one of peripheral regions composed by neighboring pixels which neighbor around pixels composing said kernel region wherein probability values against said neighboring pixels are larger than a second threshold value which is smaller than said first value, and an objective region specifying step which specifies objective regions based on at least one of said peripheral regions.

11. An object image detecting method according to claim 10, wherein;

said probability mapping step computes said probability value P for distance image against each of said pixels by using an equation given by $$P = \frac{1}{C^{\frac{(d-d_0)^2}{a}}} \quad (C > 1)$$

where, $d_0$ and d are said most likely distance and each of said distances given by said distance determination step for said pixels, respectively and C and α are both constant values.

12. An object image detecting method according to claim 11, wherein;
a periphery detection step which selects a predetermined quantity of said peripheral regions in a decreasing order of region areas, and
said objective region specifying step specifies objective regions based on said predetermined quantity of said peripheral regions.

13. An object image detecting method according to claim 11, wherein;
said periphery detection step selects a predetermined quantity of said peripheral regions in a decreasing order of region areas, and
said objective region specifying step specifies a rectangular region that circumscribes a predetermined quantity of said peripheral regions as said objective region.

14. An object image detecting method according to claim 10, wherein;
said object distance determination step has further a spatial filter to provide filtrated distances by interpolating said distances given by said distance determination step for said pixels,
said histogram generation step specifies frequencies of said pixels against a plurality of distance ranges which are classified over said filtrated distances given by said distance determination step, and
said object distance determination step determines a most likely distance among said plurality of distance ranges by selecting a distance range which has the largest frequency of said pixels among pixel frequencies specified by said histogram.

15. An object image detecting method according to claim 14, wherein;
said periphery detection step selects a predetermined quantity of said peripheral regions in a decreasing order of region areas, and
said objective region specifying step specifies said predetermined quantity of said peripheral regions as said objective regions.

16. An object image detecting method according to claim 14, wherein;
said periphery detection step selects a predetermined quantity of said peripheral regions in a decreasing order of region areas, and
said objective region specifying step specifies a rectangular region that circumscribes a predetermined quantity of said peripheral regions as said objective region.

17. An object image detecting method according to claim 10, wherein;
said periphery detection step selects pixels against which probability values are larger than said second threshold values among pixels adjacent to said kernel region, repetitively selects pixels against which probability values are larger than said second threshold values among pixels adjacent to those selected pixels therebefore and ultimately determines peripheral regions in such repetitive selection.

18. An object detecting method using said object image detecting method according to claim 10.

19. A computer program embodied on a computer readable medium for detecting an object image by using a plurality of images concurrently acquired by a plurality of cameras which take said plurality of images composed of pixels, comprising:
a distance determination program which determines distances to portions, of which images are represented by said pixels, of an object to visually be detected wherein parallaxes obtained on a plurality of images are used,
a histogram generation program which specifies frequencies of said pixels against a plurality of distance ranges which are classified over said distances given by said distance determination program,
an object distance determination program which determines a most likely distance among said plurality of distance ranges by selecting a distance range which has the largest frequency of said pixels among pixel frequencies specified by said histogram,
probability mapping program which generates a map of probability values against said pixels wherein said probability values are computed by differences between said most likely distance and said distances given by said distance determination program,
a kernel detection program which detects a kernel region composed by pixels against which said probability values are larger than a first threshold value,
a periphery detection program which detects at least one of peripheral regions composed by neighboring pixels which is neighbor around pixels composing said kernel region wherein probability values against said neighboring pixels are larger than a second threshold value which is smaller than said first value, and
an objective region specifying program which specifies objective regions based on at least one of said peripheral regions.

20. A computer program according to claim 19, wherein;
said probability mapping program computes said probability value P for distance image against each of said pixels by using an equation given by $$P = \frac{1}{C^{\frac{(d-d_0)^2}{a}}} \quad (C > 1),$$

where, $d_0$ and d are said most likely distance and each of said distances given by said distance determination program for said pixels, respectively and C and a are both constant values.

21. A computer program according to claim 20, wherein;
a periphery detection program which selects a predetermined quantity of said peripheral regions in a decreasing order of region areas, and said objective region specifying program specifies objective regions based on said predetermined quantity of said peripheral regions.

22. A computer program according to claim 20, wherein;
said periphery detection program selects a predetermined quantity of said peripheral regions in a decreasing order of region areas, and
said objective region specifying program specifies a rectangular region that circumscribes a predetermined quantity of said peripheral regions as said objective region.

23. A computer program according to claim 19, wherein;
said object distance determination program has further a spatial filter to provide filtrated distances by interpolating said distances given by said distance determination program for said pixels,
said histogram generation program specifies frequencies of said pixels against a plurality of distance ranges which are classified over said filtrated distances given by said distance determination program, and
said object distance determination program determines a most likely distance among said plurality of distance ranges by selecting a distance range which has the largest frequency of said pixels among pixel frequencies specified by said histogram.

24. A computer program according to claim 23, wherein;
said periphery detection program selects a predetermined quantity of said peripheral regions in a decreasing order of region areas, and
said objective region specifying program specifies said predetermined quantity of said peripheral regions as said objective regions.

25. A computer program according to claim 23, wherein;
said periphery detection program selects a predetermined quantity of said peripheral regions in a decreasing order of region areas, and
said objective region specifying program specifies a rectangular region that circumscribes a predetermined quantity of said peripheral regions as said objective region.

26. A computer program according to claim 19, wherein;
said periphery detection program selects pixels against which probability values are larger than said second threshold values among pixels adjacent to said kernel region, repetitively selects pixels against which probability values are larger than said second threshold values among pixels adjacent to those selected pixels therebefore and ultimately determines peripheral regions in such repetitive selection.

27. An object detecting method using said computer program embodied on a computer readable medium for detecting an object image according to claim 19.

* * * * *